C. DURKEE & C. C. BRIGGS.
FISHING REEL.
APPLICATION FILED MAY 27, 1907.
943,820.
Patented Dec. 21, 1909.
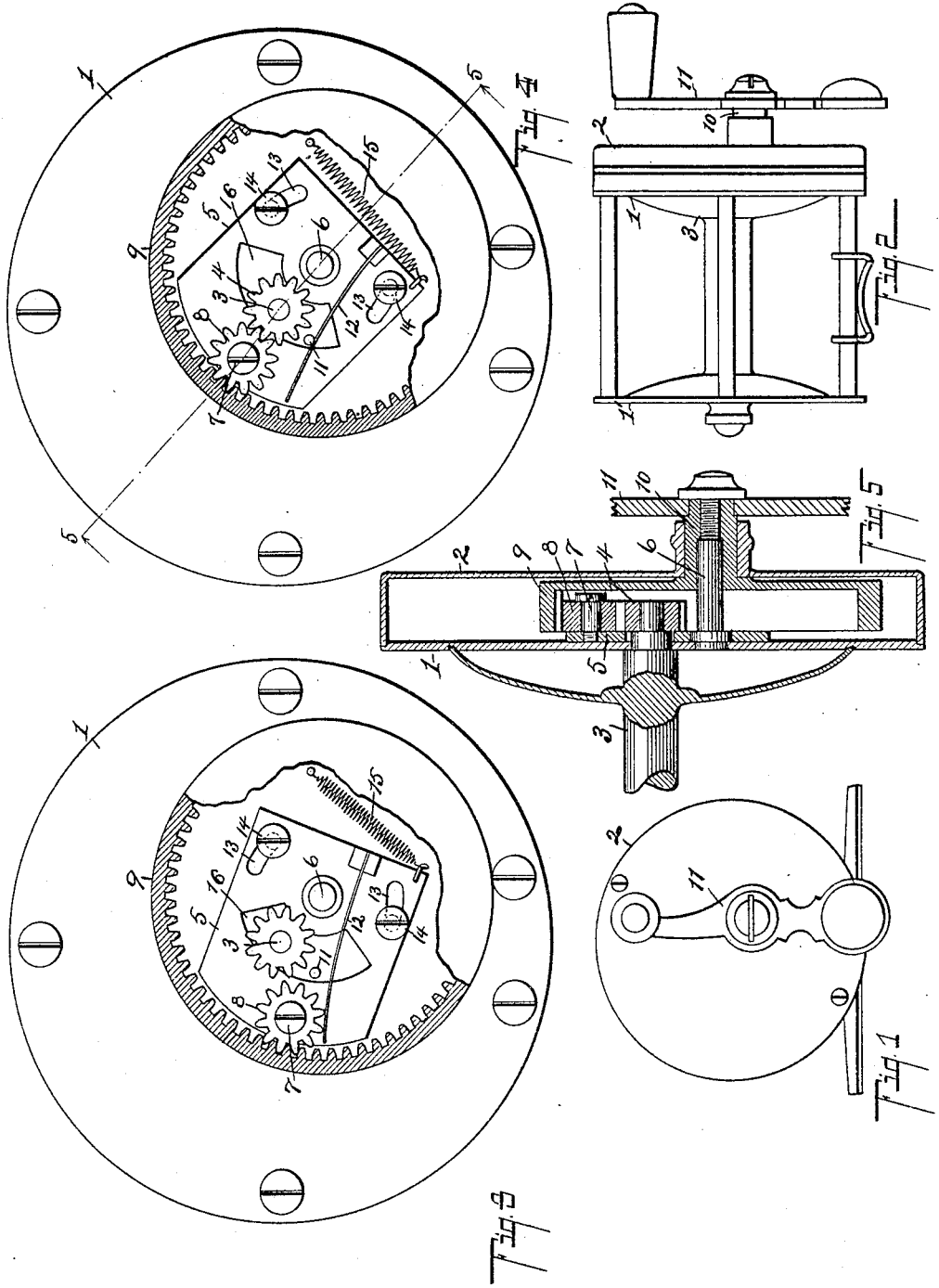
Witnesses:
Lulu Greenfield
Gertrude Tallman
Inventors.
Caroon Durkee
Clarence C. Briggs
By Chappell & Earl
Att'y.s

UNITED STATES PATENT OFFICE.

CARSON DURKEE AND CLARENCE C. BRIGGS, OF VICKSBURG, MICHIGAN.

FISHING-REEL.

943,820.          Specification of Letters Patent.      Patented Dec. 21, 1909.

Application filed May 27, 1907. Serial No. 375,920.

*To all whom it may concern:*

Be it known that we, CARSON DURKEE and CLARENCE C. BRIGGS, citizens of the United States, residing at the village of Vicksburg, county of Kalamazoo, State of Michigan, have invented certain new and useful Improvements in Fishing-Reels, of which the following is a specification.

This invention relates to improvements in fish line reels.

The main object of this invention is to provide an improved fish line reel in which the spool is automatically disconnected or freed from the crank on the unwinding movement of the spool or the running out of the line, and automatically connected therewith on the forward or winding movement of the crank.

Further objects, and objects relating to details of construction, will definitely appear from the detailed description to follow.

We accomplish the objects of our invention by the devices and means described in the following specification.

The invention is clearly defined and pointed out in the claims.

A structure embodying the features of our invention is clearly illustrated in the accompanying drawing, forming a part of this specification, in which, Figure 1 is an end elevation of a structure embodying the features of our invention; Fig. 2 is a side elevation thereof; Fig. 3 is an enlarged detail with the crank and the cap 2 of the frame head removed, the driving gear 9 being partially broken away to show the relation of the parts, and the driving connections for the driving gear of the spool being in their operative position; Fig. 4 is a similar view with the driving connections for the driving gear and spool in their operative position; and Fig. 5 is a detail section taken on a line corresponding to line 5—5 of Fig. 4.

In the drawing, the sectional views are taken looking in the direction of the little arrows at the ends of the section lines, and similar numerals of reference refer to similar parts throughout the several views.

Referring to the drawing, the frame of the reel is preferably made up of the usual head and tail 1 and 1', respectively, connected by suitable pillars. The head cap 2 is adapted to inclose the gear connections for the spool 3 and crank 11. The spool 3 is journaled in suitable bearings in the frame, and is provided on its head end with a pinion 4. The driving gear 9, which is preferably an internal gear, as is illustrated, is mounted on a suitable spindle 6, and is provided with an outwardly-projecting hub 10, to which the crank 11 is secured. The transfer or connecting pinion 8 for the driving gear 9 and the spool pinion 4 is arranged to mesh with the driving pinion 9, as clearly appears from the drawing. The bearing stud 7 for the transfer pinion 8 is mounted on the plate 5. This plate 5 is preferably mounted on the spindle 6, and adapted to swing thereon. The driving gear 9 is arranged eccentrically relative to the pinion 4, so that, by swinging the pinion supporting plate 5 forwardly, the transfer pinion 8 is brought into mesh with the spool pinion 4, the position of the parts then being as illustrated in Fig. 4.

When the parts are in their normal or initial position, as is shown in Fig. 3, the pinion 8 is swung out of mesh with the spool pinion. The pinion support 5 is held yieldingly in its initial position by means of the spring 15, which is connected to the pinion support, and to the head plate of the reel. The pinion supporting plate is preferably provided with slots 13, through which the screws 14 are arranged, which hold the support firmly in place, and, at the same time, permit the rocking movement thereof. These slots and pins also serve as a stop means for limiting the movement of the pinion support. The pinion supporting plate 5 is also provided with a slot 16, through which the journal of the spool is arranged.

With the parts thus arranged, on the forward or winding movement of the crank, the pinion support is swung forwardly to bring the transfer pinion into mesh with the spool pinion. However, as soon as the tension on the line is released, the spool is automatically freed from the crank, and on the running out of the line, the spool is entirely free from the crank.

To serve as a brake or stop means for the crank, and also to insure the swinging of the pinion support on the forward or winding movement of the crank, we provide a spring 12, which is arranged to bear on the transfer pinion. This spring is mounted on the transfer pinion support 5, and, when the support is in its initial position, bears on the teeth of the transfer pinion, as is illustrated. When, however, the transfer pinion is in mesh with the spool pinion, the spring is held out of its engaging position by means of the stop pin 11; see Fig. 4.

We thus secure a structure in which the spool, during its unwinding movement, or on the running out of the line, is entirely freed from the crank, and one in which the crank is automatically connected to the spool on the forward or winding movement of the crank. This prevents in a large measure the back lash in casting as the spool does not acquire as great a momentum as it does where the crank is connected thereto, and in connection with the driving gear acts as a balance wheel.

We have illustrated and described our invention in detail in the form preferred by us on account of the structural simplicity and economy. We are, however, aware that it is capable of considerable variation in structural details without departing from our invention, and we desire to be understood as claiming the same broadly, as well as specifically, as illustrated.

Having thus described our invention, what we claim as new and desire to secure by Letters Patent is:

1. The combination with a frame, of a spool journaled therein; a pinion secured to said spool; an internal driving gear arranged eccentrically relative to said spool pinion; a spindle for said driving gear; a transfer pinion arranged to mesh with said driving gear; a swinging support for said transfer pinion mounted on said driving gear spindle, whereby the said pinions are brought into mesh by the forward movement of said pinion support; means for limiting the movement of said pinion support; a spring for holding said pinion support yieldingly in its rearward position; a spring carried by said pinion support, arranged to bear on said transfer pinion when said pinion support is in its rear position; and a pin adapted to engage said spring to hold it from engagement with said transfer pinion when it is in mesh with said spool pinion.

2. The combination with a frame, of a spool journaled therein; a pinion secured to said spool; an internal driving gear arranged eccentrically relative to said spool pinion; a spindle for said driving gear; a transfer pinion arranged to mesh with said driving gear; a swinging support for said transfer pinion mounted on said driving gear spindle, whereby the said pinions are brought into mesh by the forward movement of said pinion support; means for limiting the movement of said pinion support; and a spring for holding said pinion support yieldingly in its rearward position.

3. The combination with a frame, of a spool journaled therein; a pinion secured to said spool; an internal driving gear arranged eccentrically relative to said spool pinion; a spindle for said driving gear; a transfer pinion arranged to mesh with said driving gear; a swinging support for said transfer pinion mounted on said driving gear spindle, whereby the said pinions are brought into mesh by the forward movement of said pinion support; a spring for holding said pinion support yieldingly in its rearward position; a spring carried by said pinion support, arranged to bear on said transfer pinion when said pinion support is in its rear position; and a pin adapted to engage said spring to hold it from engagement with said transfer pinion when it is in mesh with said spool pinion.

4. The combination with a frame, of a spool journaled therein; a pinion secured to said spool; an internal driving gear arranged eccentrically relative to said spool pinion; a spindle for said driving gear; a transfer pinion arranged to mesh with said driving gear; a swinging support for said transfer pinion mounted on said driving gear spindle, whereby the said pinions are brought into mesh by the forward movement of said pinion support; and a spring for holding said pinion support yieldingly in its rearward position.

5. The combination with a frame, of a spool journaled therein; a pinion secured to said spool; an internal driving gear arranged eccentrically relative to said spool pinion; a spindle for said driving gear; a transfer pinion arranged to mesh with said driving gear; a swinging support for said transfer pinion mounted on said driving gear spindle, whereby the said pinions are brought into mesh by the forward movement of said pinion support; means for limiting the movement of said pinion support; a spring carried by said pinion support arranged to bear upon said transverse pinion when said pinion support is in its rear position; and a pin adapted to engage said spring to hold it from engagement with said transfer pinion when it is in mesh with said spool pinion.

6. The combination with a frame, of a spool journaled therein; a pinion secured to said spool; an internal driving gear arranged eccentrically relative to said spool pinion; a spindle for said driving gear; a transfer pinion arranged to mesh with said driving gear; a swinging support for said transfer pinion mounted on said driving gear spindle, whereby the said pinions are brought into mesh by the forward movement of said pinion support; a spring carried by said pinion support, arranged to bear on said transfer pinion when said pinion support is in its rear position; and a pin adapted to engage said spring to hold it from engagement with said transfer pinion when it is in mesh with said spool pinion.

In witness whereof, we have hereunto set our hands and seals in the presence of two witnesses.

CARSON DURKEE. [L. S.]
CLARENCE C. BRIGGS. [L. S.]

Witnesses:
HERMAN E. RAPP,
WILLIAM L. PAGE.